United States Patent [19]
>
> Reynolds et al.

[11] Patent Number: 4,515,029

[45] Date of Patent: May 7, 1985

[54] COMPOUND VARIABLE MECHANICAL ADVANTAGE SHIFTING MECHANISM

[75] Inventors: Joseph D. Reynolds, Climax; Alan R. Davis, Plainwell, both of Mich.

[73] Assignee: Eaton Corporation, Cleveland, Ohio

[21] Appl. No.: 440,121

[22] Filed: Nov. 8, 1982

[51] Int. Cl.³ .......................... G05G 9/18; G05G 7/04; F16D 23/06
[52] U.S. Cl. ............................................ 74/339; 74/97; 74/470; 74/473 R; 74/516; 74/520; 192/53 E; 192/99 S; 192/109 A
[58] Field of Search ............... 74/97, 470, 473 R, 520, 74/339, 516, 517; 192/89 R, 53 E, 53 F, 99 S, 109 A; 200/153 G

[56] References Cited

U.S. PATENT DOCUMENTS

| | | | |
|---|---|---|---|
| 1,540,247 | 6/1925 | Bowman | 192/99 S |
| 1,949,168 | 2/1934 | Maybach | 192/99 S |
| 2,019,073 | 10/1935 | Cooper et al. | 192/99 S X |
| 2,040,594 | 5/1936 | Bixby | 74/473 R |
| 2,197,938 | 4/1940 | Lapsley et al. | 74/473 R |
| 2,453,560 | 11/1948 | Westberg et al. | 74/516 |
| 3,221,851 | 12/1965 | Vandervoort | 192/53 E |
| 3,857,299 | 12/1974 | Morrison | 74/473 R |
| 3,934,485 | 1/1976 | Ratliff | 74/473 R |
| 4,022,077 | 5/1977 | Brewer et al. | 74/473 R |
| 4,073,199 | 2/1978 | Simons | 74/473 R |
| 4,104,929 | 8/1978 | Kessmar | 74/473 R |
| 4,266,438 | 5/1981 | Kessmar | 74/473 R |

FOREIGN PATENT DOCUMENTS

386837 1/1933 United Kingdom ............. 192/89 R

Primary Examiner—Allan D. Herrmann
Attorney, Agent, or Firm—C. H. Grace; H. D. Gordon

[57] ABSTRACT

A variable mechanical advantage/variable effective length shifting mechanism (30) is provided, preferably for shifting a synchronized positive clutch transmission. A compound mechanism comprises a first member (34) in the form of a variable mechanical advantage/variable effective length first class lever having a first lever portion (34), a second lever portion (42) and a fixed pivot axis (38), and a second member (44) in the form of a second class lever pivotably mounted about a pivot axis (70) extending substantially parallel to and spaced from the first pivot axis. A pivot pin (48) extending substantially parallel to the first and second pivot axis is slidably received in axially extending slots (46 and 84) provided in the first and second members, respectively. A resilient biasing member (58) is provided for resiliently biasing the pivot pin axially away from the first pivot axis and axially toward the second pivot axis. The pivot pin may overcome the bias of the biasing member to move toward the first pivot axis and away from the second pivot axis to increase the mechanical advantage of the compound mechanism by increasing the mechanical advantage of both the first class lever member and the second class lever member. The second class second member carries a shift finger (32) for pivotal movement therewith about the second pivot axis.

19 Claims, 9 Drawing Figures

COMPOUND VARIABLE MECHANICAL ADVANTAGE SHIFTING MECHANISM

BACKGROUND OF THE INVENTION

1. Field of the Invention

The present invention relates to compound variable mechanical advantage/variable effective length shifting mechanisms and in particular to compound variable mechanical advantage/variable effective length shifting mechanisms for applying a torque to a rotationally or pivotably mounted member, such as the shift shaft in a shift bar housing assembly of a remotely controlled synchronized change gear transmission, and/or for applying a substantially axial force to a member engaged by a pivotably mounted member, such as a shift rail engaged by a shift lever in a change gear synchronized transmission.

2. Description of the Prior Art

Torque arm assemblies for applying a torque to selectively rotate the shift shaft of a shift bar housing assembly of a remotely controlled transmission are well known in the prior art. Such assemblies are usually also utilized to apply a selective axial movement to the shift shafts of the shift bar housing assemblies. Shift bar housing assemblies of this type for remotely controlled transmissions may be seen by reference to U.S. Pat. Nos. 2,040,594; 3,857,299; 4,073,199; 4,104,929; 4,157,740; 4,206,826; 4,266,438; 4,348,915 and 4,269,282 all of which are hereby incorporated by reference. Typically, such shift bar housing assemblies comprise a plurality of axially slidable shift rails each of which carry a shift fork or other shifting element thereon. A transversely mounted shift shaft is rotatably and axially movably mounted in the shift bar housing assembly and carries a shift finger fixed thereto. The shift shaft is selectively axially moved in a direction transverse to the axis of the shift rails to align the shift finger with the shift block assembly or slot on a selected shift rail and then the shift shaft is selectively rotated about its axis to cause the shift finger to engage the shift block assembly to impart a desired axial movement to the selected shift rail and shift fork carried thereby.

Selected rotational and axial movement of the shift shaft is accomplished by means of a control rod which extends generally transverse to the shift shaft and which may be selectively axially moved and/or rotated about its axis. A torque arm assembly is pivotably mounted to an end of the control rod and fixedly mounted to an end of the shift shaft whereby rotational movement of the control rod will impart an axial movement to the shift shaft and an axial movement of the control rod will impart a rotational movement to the shift shaft. Typically, rotational and or axial movement of the control rod is imparted by a first class shift lever master control which is attached to the control rod by means of a crank assembly. As is known, the mechanical advantage of the remote control assembly when applying a torque to the shift shaft is inversely proportional to the effective length of the master control and the required movement of the master control to achieve a given rotational movement of the shift shaft is also inversely variable with the effective length of the master control. In prior art remote control shift mechanisms of the type described above, the effective length of the master control is usually a compromise between the desired mechanical advantage and a desire to minimize the required movement of the master control to achieve a given movement of a selected shift rail.

Shift levers for shifting sliding clutches and/or sliding gears into and out of driving engagement are also well known in the prior art. Shift levers for shifting mechanical transmissions are well known in the prior art, as may be seen, by reference to U.S. Pat. Nos. 2,197,938; 4,259,877; 3,915,027 and 3,850,047, all of which are hereby incorporated by reference. Typically, such shift levers are first class levers pivotably mounted in a tower assembly and include a first end usually gripped and pivotably moved by a driver/operator and a second end extending into and cooperating with a shift bar housing assembly having a plurality of axially movable shift rails each carrying a shift fork and a shift block member thereon. Typically, the shift lever is pivoted in one direction to align the second end thereof with the shift block member carried by a selected shift rail and is then pivoted in a transverse direction to axially move the shift rail and shift fork carried thereby.

Shift levers of this type are first class levers defined by a first portion usually gripped by the operator, a second portion usually engageable with one or more shift rails and a pivot point located between the first and second portions. As is known, if the first portion is of a fixed length, the mechanical advantage of the shift lever will vary inversely with the effective length of the second portion and the required travel of the first end of the first portion to achieve a given axial movement of a shift rail will vary directly with the effective length of the second portion. In prior art shift levers of this type, the effective length of the second portion is usually fixed and is a compromise between desired mechanical advantage and a desire to minimize the required pivotal movement of the first portion to achieve a given movement of the engaged shift rail. Shift levers of this type may be seen by reference to U.S. Pat. No. 3,934,485, hereby incorporated by reference.

Synchronized mechanical transmissions are well known in the prior art and may be seen by reference to U.S. Pat. Nos. 4,307,624; 3,929,029 and 3,221,851, all hereby incorporated by reference. Typically, such transmissions comprise constantly meshed gears on parallel shafts with synchronized positive clutches to selectively positively clutch a selected one of the gears for rotation with one of the shafts. Such synchronized positive clutches typically comprise an axially fixed positive clutch member (usually fixed to a gear) and an axially slideable positive clutch member (usually splined to a shaft for rotation therewith and axial movement relative thereto) movable towards and away from the fixed clutch member. The axially slideable positive clutch member is axially mounted on the shaft and movable toward and away from the fixed positive clutch member by a shift fork or the like. A blocking mechanism is provided interposed the two positive clutch members to prevent engagement of the positive clutch members if they are not rotating at a synchronous or substantially synchronous speed. A relatively high torque capacity friction synchronizer clutch is provided for causing the two positive clutch members to rotate at a synchronous speed, such friction synchronizer clutch being applied by the axially movable positive clutch member usually through the blocker means. When the positive clutch members are caused to rotate at a substantially synchronous speed, the blocker mechanism will "unblock" allowing the axially movable positive clutch member to move axially therethrough and into positive engagement with the axially fixed positive clutch member. In transmissions carrying relatively large torque loads, such as mechanical change gear transmission for heavy duty trucks, the axial force required to properly engage the frictional synchronzing clutches in considerable.

The axial movement of the axially movable positive clutch member from a fully disengaged to a fully engaged position may be separated into three distinct segments. The first segment is an initial movement of the axially movable positive clutch member into engagement with the blocker and initial engagement of the frictional synchronizing clutch. This first segment of axial movement typically requires a relatively small axial movement and a relatively low axial force. The second segment is axial movement to fully frictionally engage the synchronizer clutch sufficiently to cause synchronization of the positive clutch members. This second segment of clutch movement requires very little axial movement (compresion of the friction surfaces) and a relatively high axial force. The third segment is a final clutch movement after synchronization is achieved and the unblocking means has unblocked wherein the axially movable clutch member moves through the blocker and into engagement with the other positive clutch member. This final segment of axial movement typically requires a relatively low axial force and a relatively large axial travel.

The prior art shift levers for synchronized mechanical transmissions for heavy duty vehicles were not totally satisfactory as if the second lever portion was of a short enough effective length to provide a satisfactory mechanical advantage, the required travel of the first portion was larger than desired and often objectionable, especially in the cab of a heavy duty truck where space is often very limited and if the second portion was of a large enough effective length to provide an acceptable travel of the first portion the mechanical advantage thereof was reduced requiring an often objectionable amount of driver effort to engage the frictional synchronizing clutches.

SUMMARY OF THE INVENTION

In accordance with the present invention, the drawbacks of the prior art have been overcome or minimized by the provision of a compound variable mechanical advantage/variable effective length shift mechanism for applying a torque to a member fixed for rotation therewith or for applying an axial force to a member engaged thereby. The compound mechanism includes a first rigid member pivoted about its midpoint to define a first class lever. One end of the first member is adapted for engagement by a means (usually an operator's hand) for applying an actuating force which results in pivotal movement of the other end of the first member. The other end of the first member is provided with an axially extending elongated slot in which is slidably received a connecting member such as a pivot pin or the like. The second member is pivoted at one end thereof and at the other end provided with an axially extending slot in which the connecting member is slidably receivable. Biasing means are provided to bias the connecting member axially away from the pivot point of the first rigid member and axially toward the pivot point of the second rigid member. The second rigid member is provided with either an engagement member such as a shift finger interposed the pivot mounting thereof and the other end thereof to define a second class lever or is attached at the pivot point thereof for rotation with a member to be rotated to define a torque arm. Movement of the connecting member in the slots provided in the first and second rigid members toward the pivot point of the first member and away from the pivot point of the second member will increase the mechanical advantage of the first member and the mechanical advantage of the second member to provide a compound increase in mechanical advantage of the mechanism.

As is known, first class levers comprise a relatively rigid body having a first end on which a force is applied, a second end for applying a force against a load and a fulcrum or pivot point intermediate the first and second ends. Assuming a fixed separation of the first end from the fulcrum, the mechanical advantage of a first class lever is inversely proportional to the separation of the second end from the fulcrum point, and the required pivotal movement of the first end about the fulcrum to cause a fixed circumferential movement of the second end about the fulcrum is also inversely proportional to the separation of the second point from the fulcrum point. Accordingly, in a first class lever, an increase in mechanical advantage gained by decreasing the effective length of the second end from the fulcrum is accompanied by the disadvantage of requiring a greater movement of the first end to achieve a given movement of the second end. Second class levers, as is well known also, comprise a relatively rigid body mounted at one end to a fulcrum or pivot point having a distant end at which a force is applied and applying a force against a resistance at a point intermediate the fulcrum and the force applying end. Assuming a fixed separation of the load from the fulcrum, the mechanical advantage of a second class lever is directly proportional to the separation of the point at which force is applied from the fulcrum as is the required movement of the point at which force is applied to achieve a given movement of the load. Accordingly, an increase in mechanical advantage achieved by increasing the separation of the point of application of force from the fulcrum is accompanied by the disadvantage of an increased requirement of movement of the force to achieve a given movement of the load. Torque arms, as is also well known in the art, comprise a relatively rigid body fixed for rotation about the rotational axis of a member, such as a shaft, to be rotated against a resistance and having a distant end at which a force is applied. The torque applied to the member to be rotated is directly proportional to the separation of the point at which force is applied from the rotational axis of the member to be rotated and thus the mechanical advantage of a torque arm is directly proportional to the separation of the point at which force is applied to the torque arm from the rotational axis of the member to be rotated. The circumferential movement of the point at which force is applied to achieve a given rotational movement of the member to be rotated is also directly proportional to the separation of the point at which force is applied from the rotational axis of the member to be rotated. Accordingly, an increase in mechanical advantage of a torque arm achieved by increasing the separation of the point at which force is applied from the rotational axis of the member to be rotated is accompanied by the disadvantage of an increased requirement of circumferential movement of the point at which force is applied to achieve a given rotational movement of the member to be rotated.

Compound mechanisms comprising a first lever utilized to apply a force to a second lever or torque arm whereby the mechanical advantage of the mechanism is increased by compounding the mechanical advantage of both the first lever and the second lever or torque arm are also well known in the prior art. Briefly, the mechanical advantage of such a mechanism is the product of the mechanical advantage of the first lever multiplied by the mechanical advantage of the second lever or torque arm. By way of example, assuming a first lever having a two to one mechanical advantage is utilized to apply a force to a second lever having a mechanical advantage of three to one the mechanism will have a total mechanical advantage of six to one.

The variable mechanical advantage/variable effective length shifting mechanism of the present invention is particularly well suited as a shifting mechanism for selectively axially moving shift rails engaged by an engaging member, usually a shift finger, fixed for movement with the second member or for rotating shift shafts which are rotationally fixed to the second member at the pivot point thereof. The mechanism is especially well suited for shifting synchronized transmissions wherein the resilient means are selected to be sufficient to maintain the connecting member in a position most axially spaced from the pivot point of the first member when resistance to axial movement of a shift rail or rotational movement of a shift shaft is less than a predetermined limit such as occurs during the first and third segments of axial movement of a synchronized clutch assembly but is insufficient to prevent axial movement of the connecting member toward the pivot point of the first member when resistance to axial movement of a shift rail or rotational movement of a shift shaft is greater than a predetermined limit such as would occur during the second segment of axial movement of a synchronized clutch assembly wherein the frictional synchronizer clutches are fully engaged and it is desirable to greatly increase the mechanical advantage of a shifting mechanism.

Accordingly, it is an object of the present invention to provide a new and improved compound shifting mechanism.

Another object of the present invention is to provide a new and improved compound variable mechanical advantage/variable effective length shifting mechanism for axially moving a shift rail of a synchronized positive clutch transmission by axial engagement thereof or by means of rotation of a shift shaft.

These and other objects and advantages of the present invention will become apparent from a reading of the description of the preferred embodiment taken in view of the attached drawings.

DESCRIPTION OF THE PREFERRED EMBODIMENT

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. The terms "pivot" and "rotate" as used herein will both refer to movement of a specified object about an axis. The foregoing applies to normal derivatives of the above mentioned terms and terms of similar import.

This application is related to copending applicaton Ser. No. 419,851 filed Sept. 20, 1982, entitled Variable Mechanical Advantage Shift Lever and copending application Ser. No. (436,137) filed (10-22-82), entitled Variable Mechanical Advantage Torque Arm Assembly, both assigned to the assignee of this application.

Change gear heavy duty truck transmissions, preferably of the synchronized type utilizing synchronized positive clutches, are well known in the prior art as may be seen by reference to U.S. Pat. No. 3,105,395 hereby incorporated by reference. First class lever mechanisms for directly shifting such change gear transmissions are well known in the art as may be seen to reference to U.S. Pat. Nos. 3,934,485 and 4,022,077, hereby both incorporated by reference. Remote controls for shifting transmissions of this type are also well known in the art as may be seen by reference to U.S. Pat. Nos. 2,040,549; 4,104,929, or, 4,157,740 and 4,206,826, all hereby incorporated by reference. Such transmissions typically included a shift bar housing assembly an example of which may be seen schematically in FIG. 6. The shift bar housing assembly 10 typically comprises a plurality of axially movable shift rails, 12, 14 and 16, each of which carry a shift fork 18, 20 and 22, respectively, fixed thereto for axial movement therewith.

Figures 5, 6:
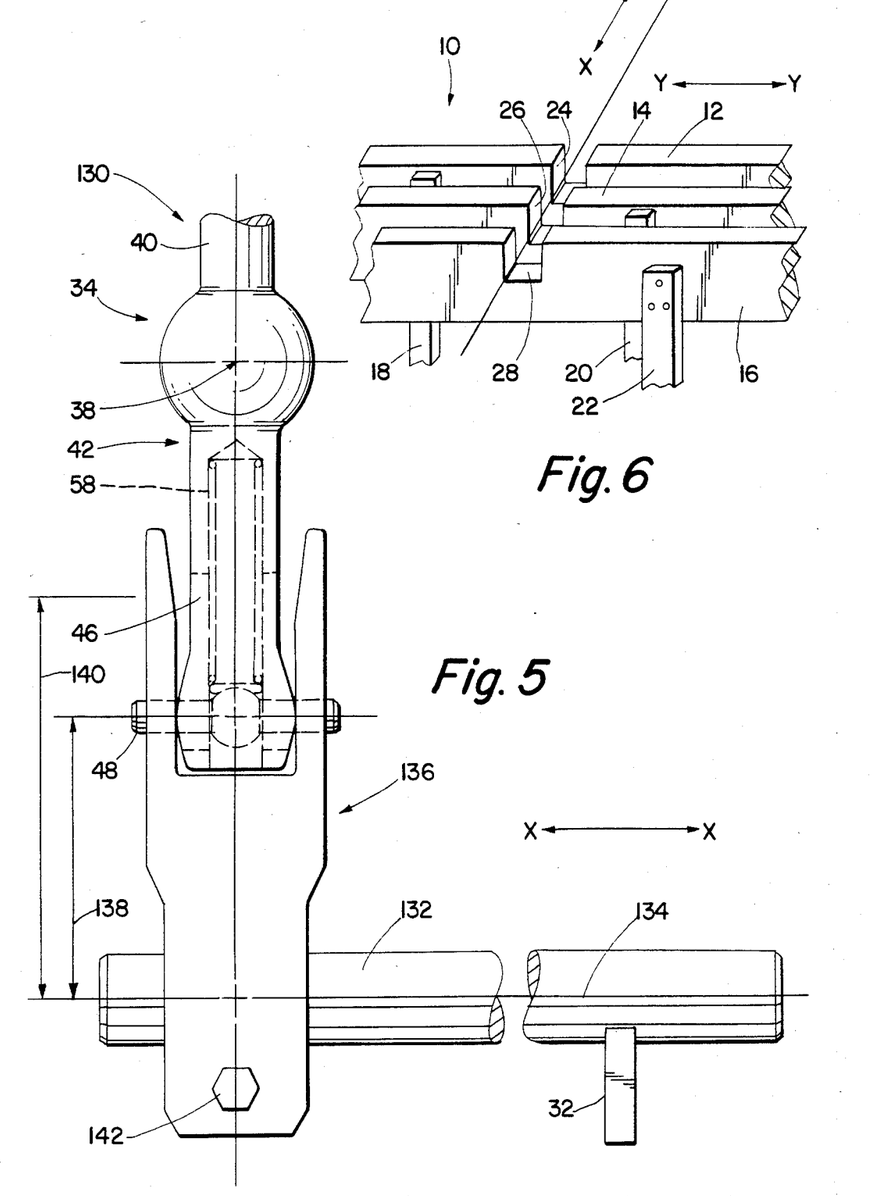
FIG. 5 is a partial front view of an alternate embodiment of the variable mechanical advantage/variable effective length mechanism of the present invention.
FIG. 6 is a schematic illustration of a portion of a shift bar housing assembly utilizing axially movable shift rails.

Typically, shifting of such transmissions is accomplished by selecting a shift rail by moving an engagement member such as a shift finger along the axis X—X into alignment with a shift block or notch 24, 26, or 28 carried by the selected shift rail and then causing axial movement of the selected shift rail by rotating or pivoting the shift finger to apply an axial force in the direction of axis Y—Y. The above was accomplished by utilization of a first class lever which could be pivoted in the directions of axes X—X and Y—Y or by utilization of a shift shaft carrying a shift finger thereon which was axially movable in the direction of axis X—X and then pivotably movable about the axis X—X to apply an axial force in the direction of axis Y—Y. Such structures are well known in the prior art and the specific structure thereof form no part of the present invention.

In the case of directly shifted transmissions, the remote end of a shifting mechanism, in the prior art typically a first class lever, was utilized to align with and then apply an axial force to the shift block or slot member carried by a selected shift rail while in the case of remotely shifted transmissions a torque arm having one end thereof fixed for rotation and axial movement with the shift shaft was typically utilized to apply a selective axial and rotational movement to a shift finger carried for movement with the shift shaft.

Figure 9:
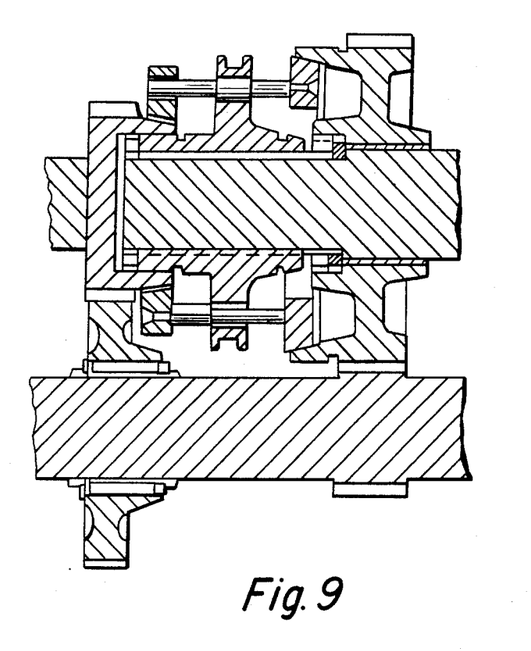
FIG. 9 is a partial cross sectional view of a gear group including a typical synchronized positive clutch assembly.

Synchronized positive clutch assemblies for synchronized constantly meshed transmissions are well known in the prior art as may be seen by reference to FIG. 9 and U.S. Pat. No. 3,221,851, hereby incorporated by reference. Typically, a synchronized positive clutch assembly is utilized for selectively engaging one of two selectable gears with a shaft. The clutch assembly typically comprise an axially movable positive clutch member axially interposed the two gears each of which gears carried a positive clutch member fixed for rotation therewith and engageable with the axially movable clutch member. Blocking means are typically interposed the positive clutch members to prevent engagement thereof in the event the positive clutch members were not rotating at synchronous substantially synchronous speed and relatively high capacity frictional synchronizing clutches are provided for causing the positive clutch members to rotate at a substantially synchronous speed, said frictional clutch members typically applied by the blocking mechanism in the blocked position thereof. Upon achievement of a substantially synchronous rotation of the positive clutch members, the blocking mechanism would move to an unblocked position allowing the axially movable clutch member to move through the blocking mechanism and into positive engagement with the selected positive clutch member. Various configurations and structures of positive synchronized clutch mechanisms are well known in the prior art and the specific construction and arrangement thereof forms no part of the present invention.

The axial movement of a synchronized positive clutch member from a fully disengaged to a fully engaged position comprises three distinct segments. The first segment of axial movement comprises the initial movement of the positive clutch member into engagement with the blocking mechanism and initial engagement of the frictional synchronizing clutches. This initial segment of axial movement requires a relatively small axial movement and a relatively small axial force. The second segment of axial movement comprises that axial movement to fully engage the frictional members of the synchronizing clutch sufficiently to bring the positive clutch members into synchronous or substantially synchronous rotation. This second segment of axial movement requires a relatively small axial movement (essentially compression of the friction material) but a relatively large axial force. The third and final segment of axial movement occurs upon achievement of synchronous or substantially snchronous rotation of the positive clutch members and subsequent unblocking of the blocker mechanism and comprises further axial movement of the axially movable positive clutch member through the blocking mechanism and into positive engagement with the selected positive clutch member and requires a relatively large axial movement and a relatively small axial force. The above described operation of a typical synchronized positive clutch assembly is well known in the prior art as are various modifications thereof. As is known, the axially movable positive clutch members typically are provided with a groove for receipt of a shift fork for axial movement therewith.

The structure and operation of a compound variable mechanical advantage/variable effective length shift mechanism 30 designed to replace a typical first class lever assembly for directly shifting a mechanical change gear transmission may be seen in greater detail by reference to FIGS. 1–4. Mechanism 30 allows selective positioning of contact member or shift finger 32 in the direction of arrow X—X to align the shift finger 32 with a shift block or notched structure on a selected shift rail and pivotal movement of shift finger 32 to an axially displaced position along the axis Y—Y to engage a selected pair of positive clutch members. Movement of shift finger 32 in the direction of arrow X—X is usually referred to as the "selection" operation and movement of shift finger 32 in the direction of arrow Y—Y is usually referred to as the "shifting" operation.

Figures 1, 2:
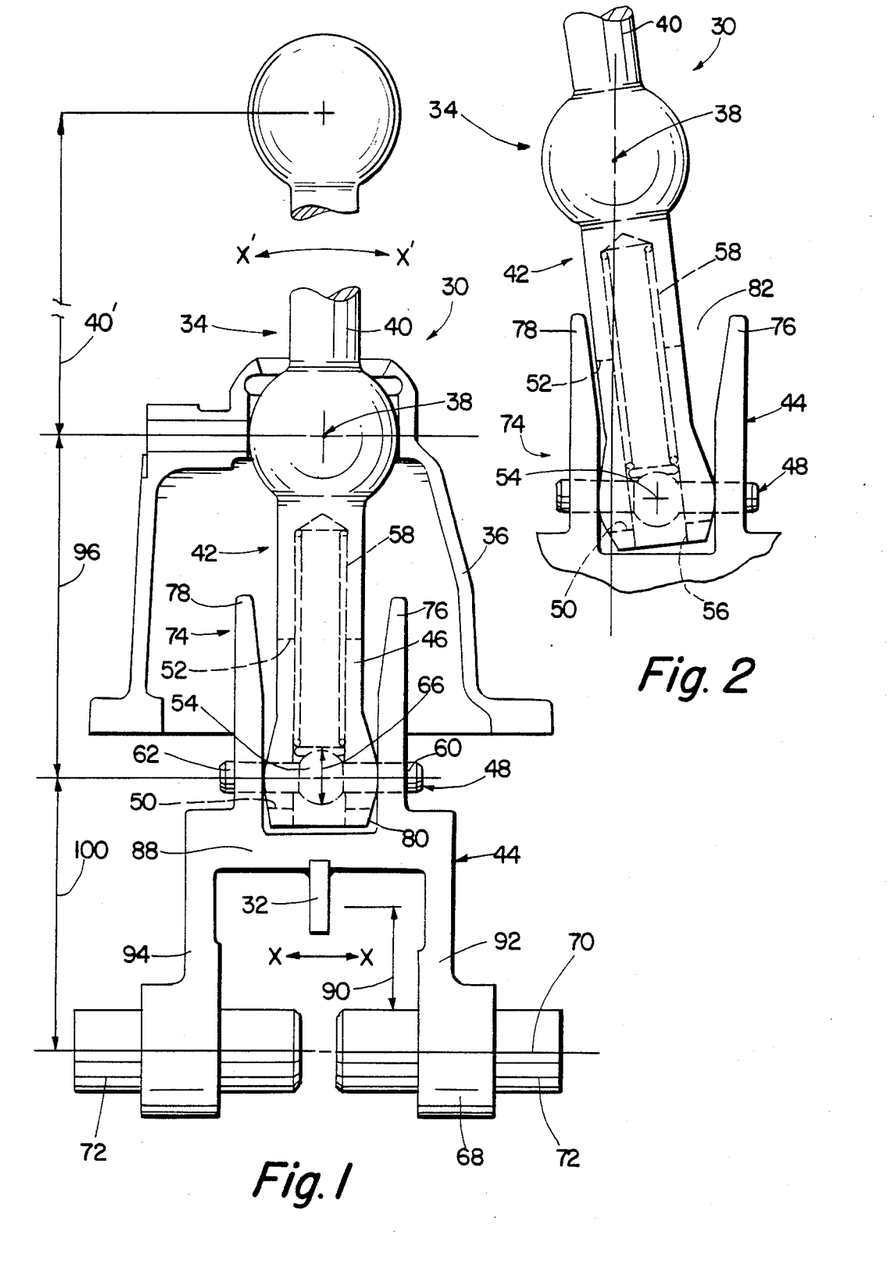
FIG. 1 is a front view of one embodiment of the compound variable mechanical advantage/variable effective length shift mechanism of the present invention.
FIG. 2 is a partial front view of the mechanism of FIG. 1 in another operational position thereof.

Shift mechanism 30 includes a first rigid member 34 mounted in a transmission tower assembly 36 for pivotal movement about a pivot point 38. Pivot point 38 defines the intersection of two pivot axes, one extending in the direction of arrow X—X, the other in the direction of arrow Y—Y, about both of which member 34 may be pivoted. The specific structural mounting of member 34 for pivotal movement about pivot point 38 may be of any well known construction, one example of which may be seen by reference to U.S. Pat. No. 3,850,047, hereby incorporated by reference, and forms no part of the present invention. Rigid member 34 consists of a first lever portion 40 (only a portion of which is shown) extending upwardly from pivot point 38 to an end adapted for receipt of a force imparting member. Usually, the unseen end of lever portion 40 comprises a knob gripable for manual manipulation by an operator as is well known in the art. First portion 40 of member 34 has a fixed effective length 40′ measured from pivot point 38 to the point of engagement with the force imparting member. Member 38 includes a second variable mechanical advantage/variable effective length lever portion 42 extending downwardly from pivot point 38 for engagement with the second rigid member 44 of mechanism 30. Portion 42 of member 34 is provided with an axially extending cross slot 46 in which a pivot pin 48 is slidably received. Slot 46 is defined by a first end 50 most distance from pivot point 38 and a second end 52 closest to pivot point 38.

Pivot pin 48 comprises an enlarged central section 54 received within a generally annular blind bore 56 provided in lever portion 42 and in which is received biasing means, compression spring 58, for biasing pin member 48 toward the bottom 50 of slot 46. Pivot pin 48 also includes a pair of substantially identical, annular cross section, reduced diameter arm or shaft sections 60 and 62 extending axially outward from central portion 54 in the direction of X—X. Slot 46 is of a width 64 which is greater than the diameter of shaft section 60 and 62 but is less than the diameter 66 of enlarged portion 54 thereby maintaining the pivot pin correctly positioned within slot 46.

Second member 44 of compound mechanism 30 is a substantially rigid body pivotably mounted at one end 68 thereof about a pivot axis 70 defined by stub shafts 72 which may be pivotably and axially slidably mounted in a shift bar housing. The other end, 74, of second member 44 defines a bifurcated portion defined by substantially parallel walls 76 and 78 adapted for receipt of the enlarged end 80 of portion 42 of first member 34 therebetween. The opening 82 between walls 76 and 78 may be flared outwardly to provide clearance for portion 42 of member 34 as is known in the art and as may be seen by reference to FIG. 2. Wall members 78 and 76 are provided with an aligned cross slot 84 in which the axially outer ends of shaft portions 60 and 62 are slidably received. Slot 84 is of a width 86 generally equal to the diameter of shaft sections 60 and 62 whereby an axial movement of pin member 48 in the direction of arrow Y—Y will result in a pivotal movement of second rigid member 44 about pivot axis 70 as may be seen by reference to FIGS. 3 and 4. Shift finger 32 extends downwardly from cross wall portion 88 of second rigid member 44 and is spaced from pivot axis 70 by a fixed distance 90. A pair of substantially parallel bottom side walls, 92 and 94, extend downwardly from cross wall 88 to stub shafts 72 and are designed to straddle one or more shift rails and to permit axial movement of second member 44 in the direction of arrow X—X sufficiently to allow alignment of shift finger 32 with a selected notch mechanism on a selected shift rail.

As may be seen by reference to FIGS. 1 and 2, pivotal movement of first rigid member 34 in the direction of arrows X'—X' will result in enlarged end 80 of first member 34 engaging side wall 76 or 80 of second rigid member 44 to move second rigid member 44 axially in the direction of arrow X—X allowing alignment of shift finger 32 with a selected shift rail. This is the selection operation of shift mechanism 30. The shift operation of shifting mechanism 30 is accomplished by pivotal movement of first rigid member 34 in the directon of arrows Y'—Y' which will cause axial movement of the end 80 thereof and pivot pin 48 carried thereby in the axial direction of arrow Y—Y causing a corresponding movement of end 74 of second rigid member 44 in the axial direction of Y—Y resulting in a axial movement of shift finger 32 in the axial direction of Y—Y as may be seen by reference to FIGS. 3 and 4. This is the shifting operation of compound shift mechanism 30.

As has been discussed above, the axial movement of a positive synchronized clutch assembly is accomplished by selective axial movement of shift finger 32, in engagement with a selected shift rail in the direction of Y—Y and comprises three segments, the second segment of which comprises fully engaging the frictional synchronizing clutches and requiring a substantially greater axial force then the first and third segments thereof. First member 34 of shifting mechanism 30 is a first class lever applying an axial force to second portion 44 of shifting mechanism 30 which may be considered as a second class lever having a pivot point or axis 70, a resistance to pivotal movement 32 located a distance 90 from pivot axis 70 and a point at which force is applied defined by the point of engagement of pivot pin 48 with slot 84. The effective length of second portion 42 of first member 34 is defined by the point of engagement of pivot pin 48 with slot 46. As is known, assuming a fixed effective length 40' of portion 40 of member 34, the mechanical advantage of member 34 will be inversely proportional to the separation of pivot pin 48 from pivot point 38 and the required pivotal movement in the direction of arrow Y'—Y' to achieve a given axial displacement of pivot pin 48 in the direction of arrow Y—Y will also be inversely proportional to the separation of pivot pin 48 from pivot point 38. Accordingly, an increase in mechanical advantage of member 34 by movement of pivot pin 48 in slot 46 toward pivot point 38 will be accompanied by a corresponding increase in required pivotal movement of member 34 to achieve a given axial displacement of pivot pin 48. The mechanical advantage of second rigid portion 44 is directly proportional to the magnitude of separation of pivot pin 48 from pivot axis 70 and the required axial movement of pivot pin 48 in the direction of Y—Y to achieve a given axial displacement of shift finger 32 in the direction of arrow Y—Y will also be directly proportional to the separation of pivot pin 48 from pivot axis 70.

Biasing means 58 biases pivot pin 48 axially away from pivot point 38 of rigid member 34 and axially toward pivot axis 70 of rigid member 44 and thus biasing means 58 resiliently urges compound shifting mechanism 30 into a configuration having a lower mechanical advantage to overcome the resistance of axial movement of shift finger 32 in the direction of arrow Y—Y and requiring a minimum of pivotal movement of member 34 in the direction of arrows Y'—Y' to achieve a given axial displacement of shift finger 32 in the direction of arrow Y—Y. Biasing means 58 could, of course, comprise a compression spring biasing pivot pin 48 toward pivot axis 70.

Figures 3, 4:
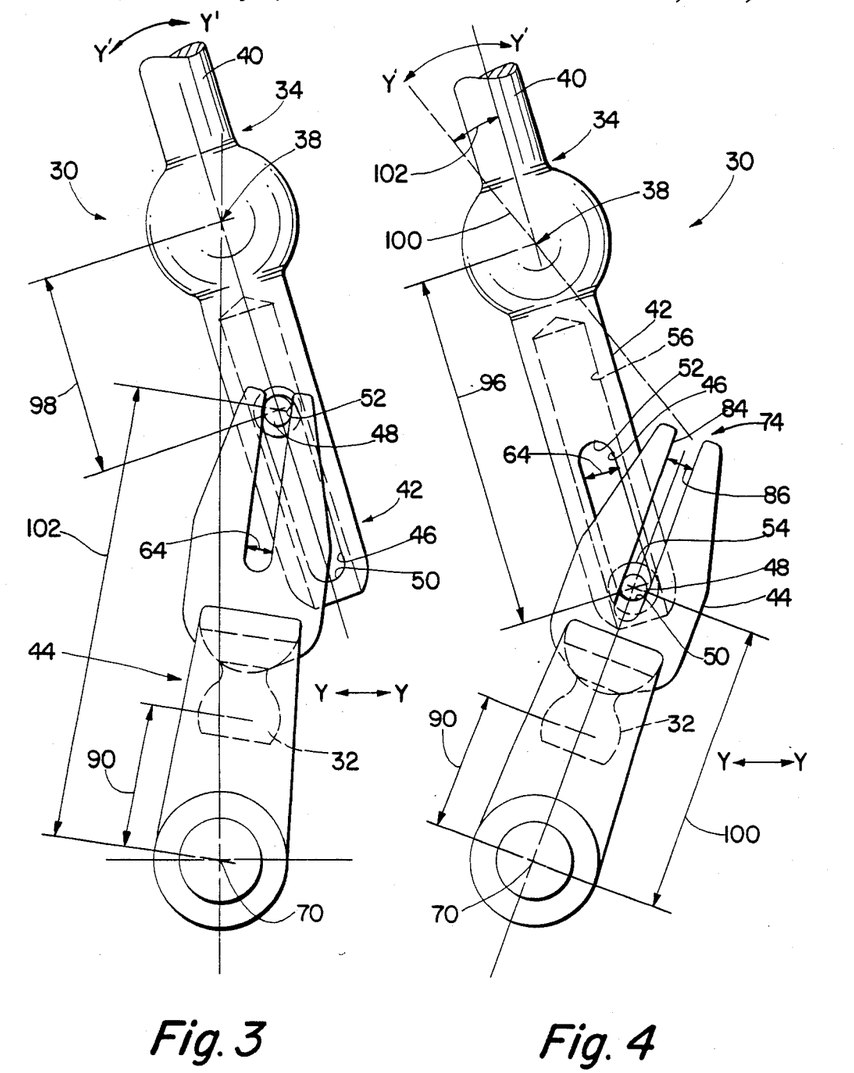
FIG. 3 is a partial side view of the mechanism of FIG. 1 in one operational position thereof.
FIG. 4 is a partial side view of the mechanism of FIG. 1 in another operational position thereof.

Biasing means 58 is selected so that the resistance to axial displacement of shift finger 32 in the direction of arrow Y—Y is insufficient to cause pivot pin 48 to move against the bias of spring 58 and move axially toward pivot point 38 and axialy away from pivot point 70 during the first and third segment of axial movement of a shift rail and shift fork and positive synchronized clutch assembly carried thereby. As the axial resistance to axial displacement of shift finger 32 in the direction of arrow Y—Y increases during the second segment of axial movement thereof as the frictional synchronizing clutches are fully applied to cause substantially synchronized rotation of two selected mating positive clutch members, the biasing force of spring 58 will be overcome as pivot pin 48 moves axialy toward pivot point 38 of first member 34 and axially away from pivot point 70 of second member 44 of shift mechanism 30. In this configuration, as illustrated in FIG. 3, the mechanical advantage of member 34 is increased as the effective length of portion 42 decreases from distance 96 as seen in FIG. 1 to distance 98 as seen in FIG. 3. At the same time, the effective length of second member 44 increases from distance 100 seen in FIG. 1 to distance 102 as seen in FIG. 3. Accordingly, the mechanical advantage of shift mechanism 30 against the axial resistance to axial displacement of shift finger 32 in the direction of arrow Y—Y is compounded by the increased mechanical advantage of first class lever first rigid member 34 and the increased mechanical advantage of second class lever second rigid member 44. It has been found, that an increase in mechanical advantage of compound shift mechanism 30 from the configuration seen in FIG. 1 to the configuration seen in FIG. 3 in the magnitude of two to one is possible within the space commonly available for shifting a mechanical change gear synchronized transmission. Along with this increased mechanical advantage comes a requirement for increased pivotal movement in the direction of arrow Y'—Y' to achieve a given axial displacement of shift finger 32 in the direction of arrow Y—Y.

Assuming the shifting mechanism 30 as shown in FIG. 3 has caused the frictional synchronizing clutches of a positive synchronized clutch assembly to be fully engaged the positive clutch members to rotate at a synchronous or substantially synchronous speed, the blocking mechanism will unblock and a further axial movement of the positive clutch member against a relatively low resistance to axial movement will be required to complete a shift. At this point, the resistance to axial movement of shift finger 32 in the direction of arrow Y—Y will become insufficient to overcome the bias of spring 58 and spring 58 will force pivot point 48 downwardly in slot 46 and slot 84 to assume the configuration illustrated in FIG. 4 wherein little or no additional pivotal movement in the direction of arrows Y'—Y' is required to obtain an increase axial displacement of shift finger 32 in the direction of arrow Y—Y against the reduced resistance to axial movement. As may be seen by reference to dotted line 100 in FIG. 4, the amount of pivotal movement of member 34 not required, 102, as a result of shifting mechanism 30 assuming the configuration shown in FIG. 4 as opposed to remaining in the configuration shown in FIG. 3 required for an acceptable mechanical advantage to apply the frictional synchronizing clutches, is considerable.

Alternate embodiment 130 of the compound variable mechanical advantage/variable effective length shift lever mechanism of the present invention may be seen by reference to FIG. 5. Components of mechanism 130 identical or substantially identical to components of mechanism 30 discussed above will be assigned like reference numerals. Compound shifting mechanism 130 is utilized to move the shift shaft 132 along its axis 134 to align a shift finger 32 carried thereby for axial and rotational movement therewith into axial alignment with a notch or block mechanism carried by one or more selectable shift rails. Shift shaft 132 is mountable in a shift bar housing assembly for axial movement and rotation about axis 134. Rotation of shift shaft 132 about its axis 134 is effective to apply an axial force to a shift rail for the shifting operation as has been described above.

Compound shifting mechanism 130 includes a first rigid member 34 substantially identical to member 34 described above. Member 34 is pivotably mounted about pivot point 38 and comprises a first lever portion 40 and a second variable mechanical advantage/variable effective length second lever portion 42. A pivot pin 48 is carried in a slot 46 in lever portion 42 for slidable movement therein. Second rigid member 136 is similar to second member 44 of mechanism 30 described above except that member 136 is fixedly mounted to shift shaft 132 for axial and rotational movement therewith and thus defines a torque arm assembly of variable mechanical advantage/variable effective length rather than a second class lever mechanism. Biasing spring 58 is selected so that it will bias pivot pin 48 away from pivot point 38 of member 34 and toward pivot axis 134 of torque arm member 136 to define a torque arm having an effective length 138 as seen in FIG. 5. Upon an increase in resistance to rotational movement of shift shaft 32 (resulting from increased axial resistance to axial movement of a selected shift rail) pivot pin 48 will overcome the bias of spring 58 and move axially upward and away from pivot axis 134 to define a torque arm having an effective length 140 as seen in FIG. 5. As is known, the mechanical advantage of a torque arm is directly proportional to the effective length thereof and the required circumferential movement of the end remote from the pivot axis thereof at which a force is applied to achieve a given rotational movement of the member to be rotated is also directly proportional to the effective length thereof. Second rigid member 136 may be fixedly attached to shift shaft 132 by a clamped spline connection including a bolt member 142 as is shown. In all other ways, the structure and operation and advantages of compound variable mechanical advantage/variable effective length shift mechanism 130 is substantially identical to that of shift mechanism 30 described above.

Figures 7, 8:
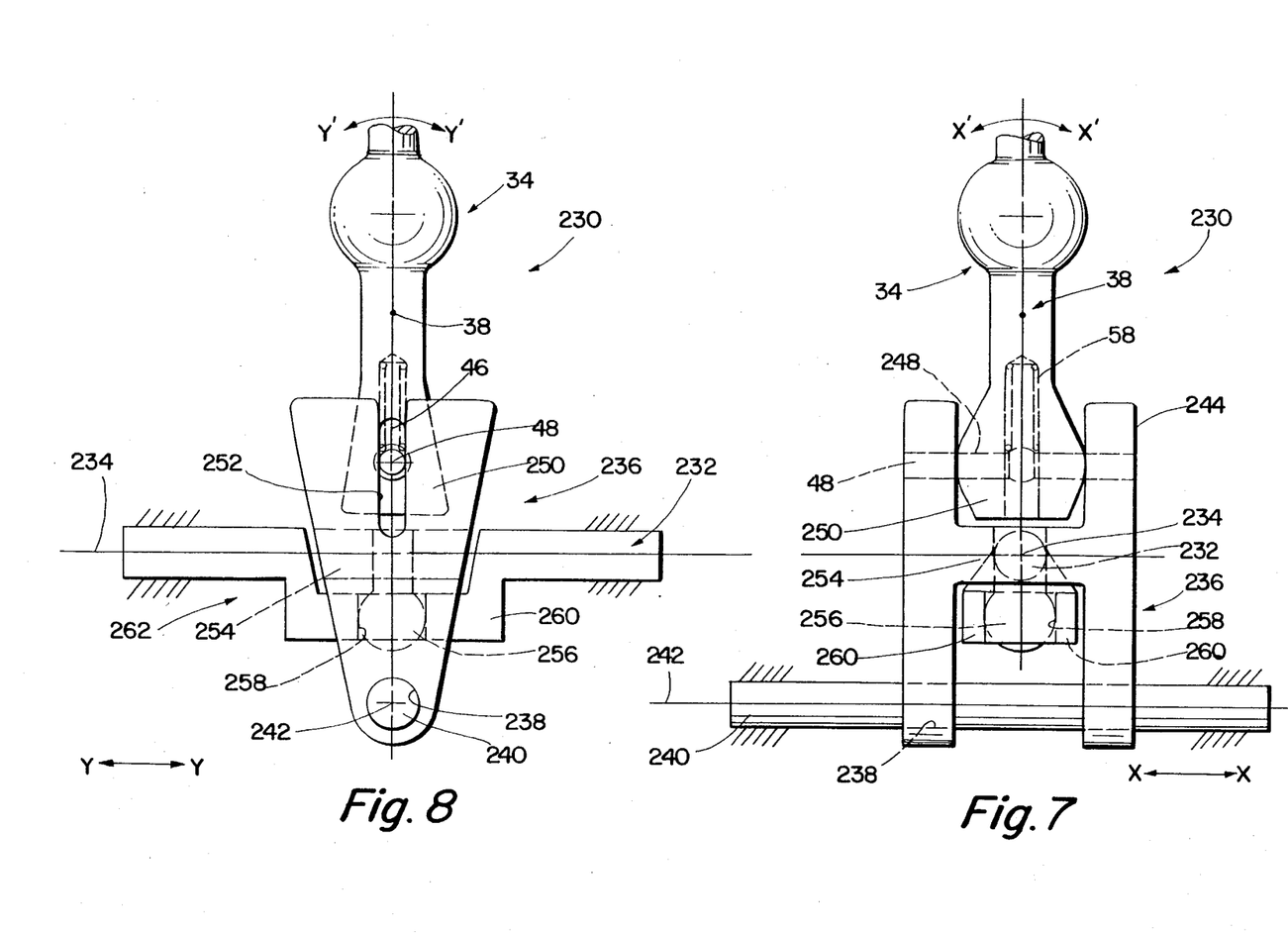
FIG. 7 is a partial front view of another alternate embodiment of the present invention.
FIG. 8 is a partial side view of the embodiment of FIG. 7.

A further alternate embodiment 230 of the variable mechanical advantage/variable effective length shift mechanism of the present invention may be seen by reference to FIGS. 7-8. Briefly, compound shifting mechanism 230 is utilized to selectively rotate a control rod 232 about its axis 234 to cause axial movement of a remotely located shift shaft (not shown) and to axially move control rod 232 along its axis 234 to rotate a remotely controlled shift shaft (not shown). Shifting mechanism 230 thus comprises the remote master control for an assembly for remotely shifting a change gear transmission of the type seen in the U.S. Pat. Nos. 4,157,740, 4,206,826; 4,073,149; 4,269,282 and 4,266,438 all of which are hereby incorporated by reference. The specific structure of the remotely controlled transmission shift bar housing mechanism controlled by the master control 230 may be of any known configuration and the specific structure thereof forms no part of the present invention.

Compound shifting mechanism 230 comprises a first rigid member 34 pivotably mounted about a pivot point 38 and defining a slot 46 in which a pivot pin 48 is slidably received and biased by a spring 58 away from pivot point 38. Thus, first rigid member 34 defines a variable mechanical advantage/variable effective length first class lever substantially functionally and structurally identical to the members 34 described in connection with mechanisms 30 and 130 above.

Shifting mechanism 230 also includes a second rigid member 236 which is similar to member 44 described above in connection with mechanism 30. Rigid member 236 is provided with a pair of through bores 238 in which a mounting shaft 240 is slidably received. Accordingly, rigid member 236 is mounted for slidable movement along the axis 242 of mounting shaft 240 and pivotal movement about a pivot axis 242. The upper end of member 236 is defined by bifurcated side walls 244 and 246 defining a space 248 in which the lower end 250 of member 34 is received. Each of the side walls 246 and 244 are provided with an open ended slot 252 which extend substantially parallel to slot 46 in which pivot pin 48 is slidably received. Second rigid member 236 also defines a cross wall 254 from which a contact member or finger 256 extends. Finger member 256 engages an aperture 258 in an off set portion 260 of a crank strucutre 262 of control rod 232.

As may be seen by reference to FIG. 7, and is as well known in the prior art, pivotal movement of rigid member 34 in the pivotal direction of arrows X'—X' will result in lower end 250 of member 34 engaging either side wall 244 or 246 of rigid member 236 causing member 236 to move axially along the axis 242 of shaft 240 in the direction of arrows X—X resulting in finger member 256 engaging the crank mechanism 262 to cause a selected rotation of control rod 232 about its axis 234. Rotation of control shaft 232 about its axis is usually the selecting operation for shift mechanism 230.

The shifting operation for control mechanism 230 usually is accomplished by selective axial movement of control rod 232 along its axis 234 in the direction of arrows Y—Y. As may be seen from reference to FIG. 8, and as has been described above in connection with mechanism 30, shift mechanism 230 comprises a compound mechanism of a first class lever, member 34, which applies a pivotal force to a second class lever, member 236, to apply an axial force to a contact member or shift finger, member 256, the resistance to axial movement of said contact member being comprised of three segments when utilized to shift a synchronized positive clutch type transmission. In the configuration shown in FIG. 8, the pivot pin 46 is biased to define a relatively long effective length for the second portion 42 of first class lever portion 34 and to define a relatively short effective length for the second class lever portion rigid member 236. Biasing means 58 is selected so that a resistance to axial movement of control rod 232 exceeding a predetermined resistance will result in pivot pin 48 moving in slot 46 toward pivot point 48 and moving in slot 252 away from pivot axis 242 thereby increasing the mechanical advantage of both members 34 and 236 to provide a compound increase in the effective mechanical advantage of shift mechanism 230. The operation of mechanism 230 when pivoting second rigid member 236 and contact finger 256 carried thereby about pivot axis 242 is identical to the operation of mechanism 30 when pivoting second member 44 about pivot axis 70 and will not described again in detail.

Accordingly, it may be seen that the present invention provides an improved compound shifting mechanism having a compound variable mechanical advantage/variable effective length, the mechanism comprises a first member defining a first class lever having a variable mechanical advantage/variable effective length which is utilized to apply a force to a second member which is either a second class lever or torque arm having a variable mechanical advantage/variable effective length whereby the mechanical advantage of the total mechanism is variable and comprises the product of the mechanical advantage of the first lever and of the second lever or torque arm. The variable mechanical advantage/variable effective length compound shifting mechanism of the present invention is especially advantageous when utilized in connection with a mechanism for shifting a synchronized mechanical transmission wherein the mechanism provides the advantages of a relatively shorter effective length of the second lever portion of the first class lever and a relatively longer effective length of the second class lever or torque arm for compounded increased mechanical advantage during the segment of shift operation requiring exertion of a substantial force, namely that segment during which the synchronizing clutches are being engaged, and also provides the advantage of a relatively longer effective length for the second lever portion of the first class lever and relatively shorter effective length for the second class lever or torque arm for final axial movement of the shift rail and shift fork to the fully engaged position of the selected positive synchronized clutch while requiring little if any additional pivotal movement of the first portion of the first lever.

Although a particular preferred embodiment and alternate embodiments of the present invention have been disclosed for illustrative purposes, it is understood that variations and modifications thereof which lie within the scope of the below claims are fully contemplated.

I claim:

1. A compound variable mechanical advantage/variable effective length shifting mechanism for axially moving a shift rail of a synchronized positive clutch transmission of the type comprising synchronzied positive clutches wherein the axial movement of a shift rail and a shift fork carried thereby will axially move a synchronized positive clutch member and wherein the axial movement of said synchronized positive clutches from a fully disengaged axial position to a fully engaged axial position comprises a first segment of axial movement wherein the axially movable positive clutch member is moved into engagement with the blocking means and the frictional synchronizing clutches are initially engaged, a second segment of axial movement wherein the frictional synchronizing clutches are fully engaged to bring the positive clutch members into substantially synchronous rotation and a third segment of axial movement occuring after substantial synchronization of the positive clutch members wherein the axially movable clutch member moves past the blocking means into positive engagement with another positive clutch member, said second segment of axial movement of said positive clutch member requiring a substantially higher axial force than is required during said third segment of axial movement of said positive clutch member, said compound shifting mechanism comprising;

a first member comprising a variable mechanical advantage/variable effective length first class lever defined by a substantially rigid first body having a first lever portion extending from a first end to a first fixed pivot axis and a second lever portion extending from said first pivot axis to a second end, said second lever portion carrying a force applying member fixed for pivotal movement therewith about said first pivot axis and movable from a first position spaced from said first pivot axis by a first distance to a second position spaced from said first pivot axis by a second distance, said second distance greater than said first distance;

a second member comprising a variable mechanical advantage/variable effective length second rigid body, said second rigid body pivotably mounted about a second fixed pivot axis parallel to and spaced from said first pivot axis, said second body extending from said second pivot axis toward said second lever portion of said first member, said second member defining an axially extending surface extending axially from a third point spaced from said second pivot axis by a third distance axially toward said second portion to a fourth point spaced from said second pivot axis by a fourth distance, said fourth distance greater than said third distance, said force applying member engageable with said contact surface from said third to said fourth point, said force applying member engageable with said contact surface at said third point when in said second position and at said fourth point when in said first position;

a shift finger fixed to said second member for pivotal movement about said second pivot axis therewith, said shift finger axially displacable in an axial direction perpendicular to a line drawn through said first and second axes and engageable with said shift rail for axially moving said shift rail along an axes substantially perpendicular to said line drawn from said first to said second pivot axes; and resilient biasing means for biasing said force applying member to said second position thereof, the biasing force of said biasing means selected so that the force required to axially displace said shift finger during said third segment of axial movement of said positive clutch member is insufficient to cause said force applying member to move from said second to said first position thereof and the force required to axially displace said shift finger during said second segment of axial movement of said positive clutch member is sufficient to cause said force applying member to move from said second to said first position thereof.

2. The compound shifting mechanism of claim 1 wherein said second member is a second class lever and said shift finger is fixedly mounted to said second member at a point intermediate said second pivot axis and said third point.

3. The compound shifting mechanism of claim 1 wherein said second member is a torque arm and said shift finger is fixedly mounted to a shift shaft which is mounted for rotation about an axis coaxial with said second pivot axis and is fixedly mounted to said second member for rotation therewith.

4. The compound shifting mechanism of claim 2 wherein said second lever portion defines an axially extending first slot in which a pivot pin extending substantially parallel to said first and second pivot axes is slidably received, and said second rigid body defines a second slot in which said pivot pin is slidably received.

5. The compound mechanism of claim 3 wherein said force applying means comprises a pivot pin extending substantially parallel to said first and second pivot axes which is slidably received in an axially extending slot defined in said second lever portion of said first member, said second member defining a second slot extending from said third point to said fourth point in which said pivot pin is slidably received, said contact surface defined by one of the side walls of said second slot.

6. The compound shifting mechanism of claim 4 wherein said first end of said first member comprises a shift knob designed for manual gripping.

7. The compound shifting mechanism of claim 5 wherein said first end of said first member comprises a knob designed for manual gripping.

8. The compound shift mechanism of claim 4 wherein a portion of said second member is defined by a bifurcated portion comprising of two substantially parallel side walls defining a third slot therebetween extending substantially perpendicularly to said first and said second slots and wherein said second lever portion of said first member is received, said second slot extending through said first and second side walls, said third slot engageable by said second lever portion upon pivotal movement thereof about a pivot axis substantially perpendicular to said first pivot axis for axially moving said second member in an axial direction substantially parallel to said first and second pivot axis.

9. The compound shifting mechanism of claim 5 wherein a portion of said second member is defined by a bifurcated portion comprising of two substantially parallel side walls defining a third slot therebetween extending substantially perpendicularly to said first and said second slots and wherein said second lever portion of said first member is received, said second slot extending through said first and second side walls, said third slot engageable by said second lever portion upon pivotal movement thereof about a pivot axis substantially perpendicular to said first pivot axis for axially moving said second member in an axial direction substantially parallel to said first and second pivot axis.

10. A compound variable mechanical advantage/variable effective length mechanism for applying a pivotal movement to a pivotably mounted device against a resistance, said mechanism comprising:

a first member comprising a variable mechanical advantage/variable effective length first class lever defined by a substantially rigid first body having a first lever portion extending from a first end to a first fixed pivot axis and a second lever portion extending from said first pivot axis to a second end, said second lever portion defining an axially extending first slot in which a pivot pin having an axis substantially parallel to said first pivot axis is slidably received for pivotal movement therewith about said first pivot axis, said pivot pin movable in said first slot from a first position spaced from said pivot axis by a first distance to a second position spaced from said first pivot axis by a second distance, said second distance greater than said first distance;

a second member comprising a variable mechanical advantage/variable effective length torque arm defined by a substantially second rigid body, said second rigid body pivotably mounted about a second fixed pivot axis spaced from and substantially parallel to said first pivot axis, said second body extending from said second pivot axis axially toward said second lever portion of said first member, said second member defining an axially extending second slot in which said pivot pin is slidably received for pivotal movement therewith, said second slot extending axially from a third point spaced from said second pivot axis by a third distance toward said second portion of said first member to a fourth point spaced from said second pivot axis by a fourth distance, said fourth distance greater than said third distance, said pivot pin engageable with the walls of said second slot from said third to said fourth point, said pivot pin engaging said walls at said fourth point when in said first position and at said third point when in said second position;

said pivotably mounted device comprises a shaft coaxial with said second pivot axis and fixed to said second member for rotation therewith about said second pivot axis; and resilient baising means for biasing said pivot pin to said second position thereof.

11. The compound mechanism of claim 10 wherein said first lever portion carries a knob for manual engagement.

12. The compound mechanism of claim 10 wherein said biasing means is selected so that the torque required to rotate said shaft exceeding a predetermined limit is sufficient to cause said pivot pin to move from said second to said first position.

13. The compound mechanism of claim 12 wherein said shaft carries a projection fixed thereto for axial and rotational movement therewith.

14. The compound mechanism of claim 5 wherein said second member is partially defined by a bifurcated portion comprising of two substantially parallel walls defining a third slot therebetween extending substantially perpendicularly to said first and second slot in which said second lever portion is received whereby pivotal movement of said first member in a plane substantially perpendicular to said first and second pivot axis will cause said second portion to engage the side walls of said third slot to move said second member axialy in a direction perpendicular to said first and second pivot axis.

15. A compound variable mechanical advantage/variable effective length mechanism for applying a pivotal movement to a pivotably mounted device against a resistance, said mechanism comprising:

a first member comprising a variable mechanical advantage/variable effective length first class lever defined by a substantially rigid first body having a first lever portion extending from a first end to a first fixed pivot axis and a second lever portion extending from said first pivot axis to a second end, said second lever portion defining an axially extending first slot in which a pivot pin having an axis substantially parallel to said first pivot axis is slidably received for pivotal movement therewith about said first pivot axis, said pivot pin movable in said first slot from a first position spaced from said pivot axis by a first distance to a second position spaced from said first pivot axis by a second distance, said second distance greater than said first distance;

a second member comprising a variable mechanical advantage/variable effective length second class lever defined by a substantially second rigid body, said second rigid body pivotably mounted about a second fixed pivot axis spaced from and substantially parallel to said first pivot axis, said second body extending from said second pivot axis axially toward said second lever portion of said first member, said second member defining an axially extending second slot in which said pivot pin is slidably received for pivotal movement therewith, said second slot extending axially from a third point spaced from said second pivot axis by a third distance toward said second portion of said first member to a fourth point spaced from said second pivot axis by a fourth distance, said fourth distance greater than said third distance, said pivot pin engageable with the walls of said second slot from said third to said fourth point, said pivot pin engaging said walls at said fourth point when in said first position and at said third point when in said second position;

said pivotably mounted device comprising a rigid projection fixed to said second rigid body at a point intermediate to said second pivot axis and said third point, said rigid projection axially displaceable in a direction transverse a line passing through said first and second pivot axes upon pivotal movement of said second member about said second pivot axis; and resilient biasing means for biasing said pivot pin to said second position thereof.

16. The compound mechanism of claim 15 wherein said first portion carries a knob for manual engagement.

17. The compound mechanism of claim 15 wherein said biasing means is selected so that a resistance to axial movement of said projection exceeding a predetermined limit is sufficient to cause said pivot pin to move from said second position to said first position.

18. The compound mechanism of claim 15 wherein said second member is partially defined by a bifurcated portion comprising of two substantially parallel walls defining a third slot therebetween extending substantially perpendicularly to said first and second slot in which said second lever portion is received whereby pivotal movement of said first member in a plane substantially perpendicular to said first and second pivot axis will cause said second portion to engage the side walls of said third slot to move said second member axialy in a direction perpendicular to said first and second pivot axis.

19. The compound mechanism of claim 15 wherein said first rigid body is mounted in a tower assembly and said rigid projection is a shift finger engageable with shift rails of a change gear transmission.

* * * * *